United States Patent

[11] 3,624,445

| [72] | Inventor | Ralph L. Cadwallader<br>Concord, Mass. |
|---|---|---|
| [21] | Appl. No. | 35,754 |
| [22] | Filed | May 8, 1970 |
| [45] | Patented | Nov. 30, 1971 |
| [73] | Assignee | EG&G, Inc.<br>Bedford, Mass. |

[54] ELECTRIC SYSTEM FOR FIRING A GASEOUS DISCHARGE DEVICE
8 Claims, 21 Drawing Figs.

| [52] | U.S. Cl. | 315/241 |
|---|---|---|
| [51] | Int. Cl. | H05b 41/19 |
| [50] | Field of Search | 315/203,<br>241, 272, 273, 274; 331/94.5 |

[56] References Cited
UNITED STATES PATENTS

| 3,246,203 | 4/1966 | VanDaelen | 315/241 |
|---|---|---|---|
| 2,721,959 | 10/1955 | Nessel | 315/203 |
| 2,999,961 | 9/1961 | Filberich | 315/203 |

*Primary Examiner*—William L. Sikes
*Attorneys*—Ralph L. Cadwallader and Lawrence P. Benjamin

ABSTRACT: This invention relates to circuits for initiating discharge of gaseous discharge devices having a trigger electrode. These circuits are arranged to apply a high-voltage trigger pulse between a trigger electrode and a main electrode of the discharge device and simultaneously to add a high-voltage pulse derived from the trigger pulse in series with the voltage on the main discharge capacitor to accelerate breakdown between the main electrodes of the discharge device.

INVENTOR
RALPH L. CADWALLADER
ATTORNEYS

INVENTOR
RALPH L. CADWALLADER
ATTORNEYS

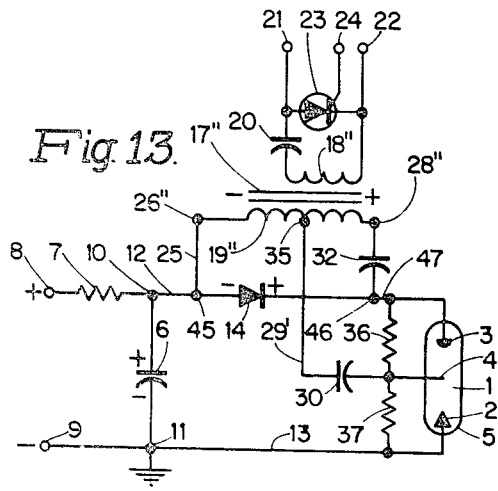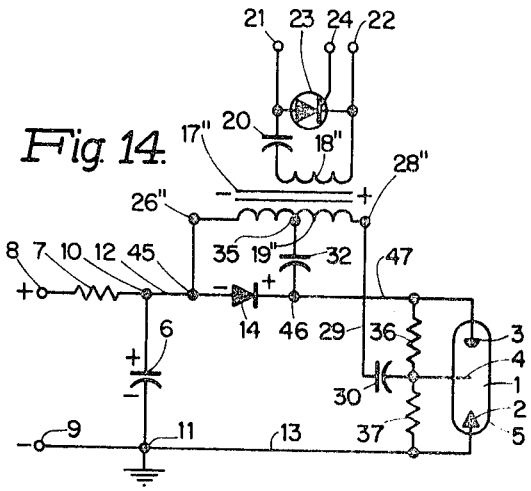

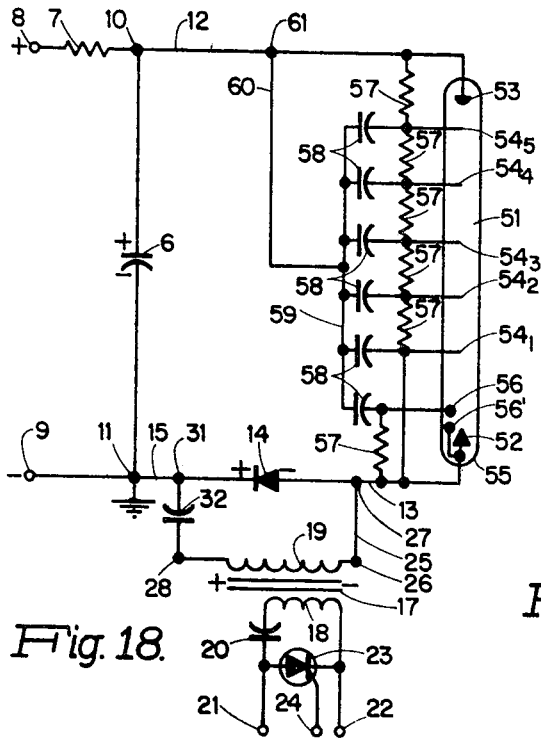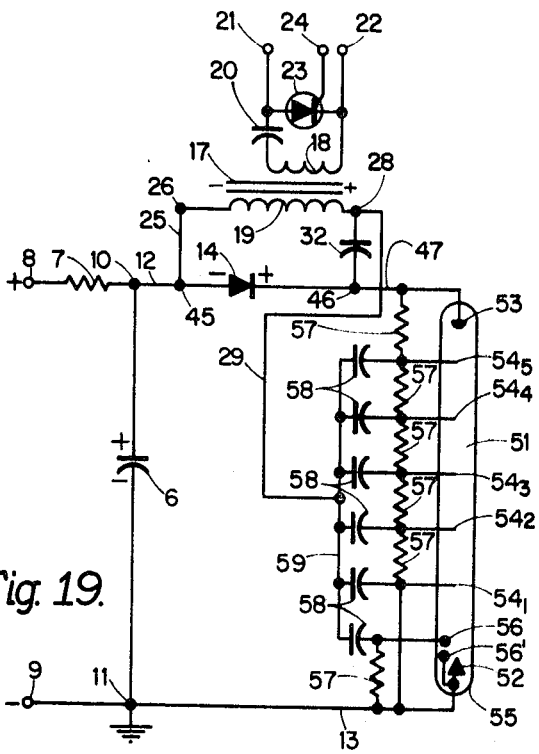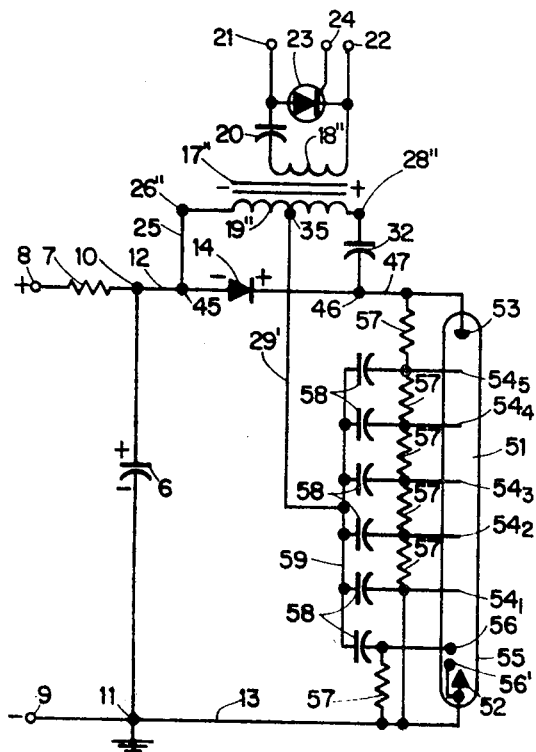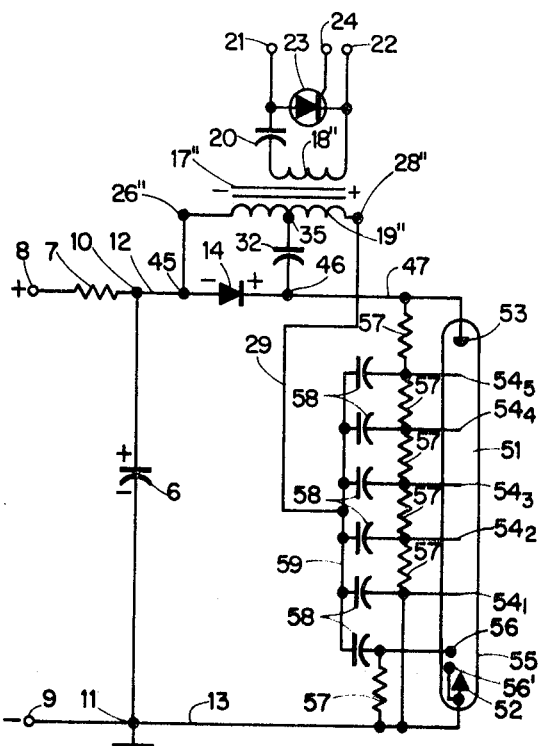

ELECTRIC SYSTEM FOR FIRING A GASEOUS DISCHARGE DEVICE

The present invention relates to electrical pulsing systems and, more specifically, to electrical impulse discharge circuits as of the type employed in stroboscopy, flash-photography and other electronic pulse modulator systems employing triggered gaseous discharge devices.

Present day systems of the above character utilize a main discharge capacitor or pulse forming network which is charged from a main power supply to a predetermined voltage. A trigger circuit is energized to apply a trigger pulse between the trigger electrode and one of the main electrodes of the gaseous discharge device. This causes the gas in the device to ionize; and breakdown occurs between the main electrodes allowing the main discharge capacitor or pulse forming network to discharge between the main electrodes. Where the gaseous discharge device is an electric flashtube having a Xenon gas fill, the discharge produces a brilliant flash of light.

In all such systems the size, weight and cost of the main power supply and of the trigger circuit are related to the amplitude of the predetermined voltage to which the main discharge capacitor is charged and of the amplitude of the trigger voltage required to initiate ionization of the gas in the discharge device. Workers in the art have for many years directed their efforts toward reducing the voltages required to operate such gaseous discharge devices and thereby achieve reduced size, weight and costs. Similarly, it is a primary object of the present invention to provide a new and improved electric system embodying a triggered gaseous discharge device that is adapted to operate with low voltages that are of themselves far too small normally to operate such devices.

Another object is to provide a new and improved electric system of the above-described character that, though employing a triggered electric discharge device, is adapted to utilize a novel series triggering arrangement which also may be used with two-electrode gaseous discharge devices. In summary this result is achieved through the use of a novel series triggering arrangement wherein a low voltage source is utilized in combination with a series voltage-adding mechanism which is rendered operative simultaneously with the application of a triggering impulse to a trigger electrode of a gaseous discharge device.

Other and further objects will become apparent upon reading the following description in conjunction with the drawings in which:

FIGS. 11, 12, 13 and 14 illustrate the invention used in further alternative embodiments of the electric system of FIG. 1; and FIGS. 15, 16, 17, 18, 19, 20 and 21 illustrate the present invention used in electric systems for operating gaseous discharge devices having a plurality of trigger electrodes.

Figure 1:
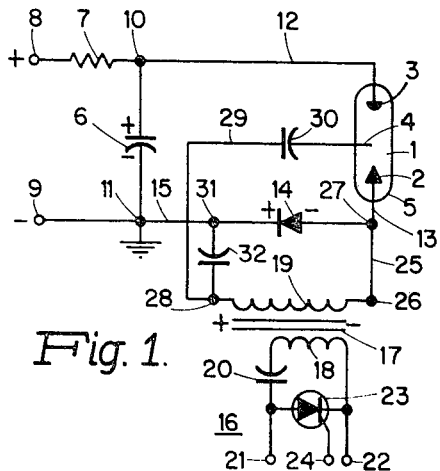
FIG. 1 is a schematic diagram of a basic electric system in which is incorporated the circuit of the present invention and which operates a three-electrode gaseous discharge device.

FIGS. 1, 2, 3 and 4 illustrate gaseous discharge device 1 as having main electrodes, which for convenience herein, and actually in some such devices, are denoted cathode 2 and anode 3, and trigger electrode 4, enclosed in an envelope 5. Envelope 5 may be filled with one or more of a variety of gases, depending upon the particular application for the discharge device. As an example, in electric flashtubes the gas fill may be a mixture of xenon, hydrogen and argon in the proportions disclosed in U.S. Pat. No. 3,399,147 issued to John L. Turner and assigned to the same assignee as the present invention.

FIGS. 1 through 21 illustrate an energy storage means denoted as main discharge capacitor 6 as being charged through limiting resistor 7 from terminals 8 and 9 of a power supply, not shown, to a predetermined DC voltage with the polarities indicated. The charging circuit may be traced from positive terminal 8, through resistor 7 to node 10, to the top, positive plate of capacitor 6, to the lower, negative plate of capacitor 6 to node 11 which is grounded, and back to negative terminal 9.

In FIGS. 1 through 4 the discharge circuit for capacitor 6 may be traced from its positive plate to node 10, along conductor 12 to anode 3, through the gas (when ionized) of discharge device 1 to cathode 2, along conductor 13 to semiconductor diode 14, through diode 14, along conductor 15 to node 11 and back to the negative plate of capacitor 6.

In FIG. 1 trigger circuit 16 has trigger transformer 17 with primary winding 18 and secondary winding 19. Primary winding 18 connects in series with capacitor 20 through terminals 21 and 22 to a power supply not shown, that charges capacitor 20. SCR 23 connects across the series circuit of capacitor 20 and primary winding 18, as illustrated. Conductor 25 connects terminal 26 of secondary winding 19 to conductor 13 at node 27. Where gaseous discharge device 1 is an electric flashtube, the usual circuit employs, without more, conductor 29 connecting terminal 28 of secondary winding 19 to capacitor 30 which, as shown, connects to electrode 4, and diode 14 is not used. In the circuit of the present invention diode 14 is used and capacitor 32 connects between terminal 28 of secondary winding 19 and conductor 15 at node 31. The trigger electrode of SCR 23 connects to terminal 24 of a signal system, not shown, which supplies a trigger signal or signals to SCR 23.

With capacitors 6 and 20 charged, a trigger signal from terminal 24 initiates operation of the system of FIG. 1. SCR 23 conducts and capacitor 20 rapidly discharges through SCR 23 and primary winding 18 of trigger transformer 17. The high amplitude voltage pulse induced in secondary winding 19 simultaneously is applied between trigger electrode 4 and cathode 2 by means of capacitor 30 and conductor 29, and conductors 25 and 13, and across diode 14 by means of capacitor 32 and conductor 25. Note that windings 18 and 19 of trigger transformer 17 are poled to produce a voltage pulse in secondary winding 19 having the polarity indicated.

The high voltage pulse applied between trigger electrode 4 and cathode 2 initiates ionization of the gas therebetween in gaseous discharge device 1, cathode 2 being driven well below ground potential. When ionization of the gas commences, trigger electrode 4 assumes the same potential level as cathode 2. However, simultaneously, a large boost voltage has been created across diode 14 with the polarity indicated which adds in series with the voltage across capacitor 6 and the voltage representing the sum of these two voltages is applied across anode 3 and cathode 2. The amplitude of this voltage is sufficiently large to initiate ionization of the gas in discharge device 1, even without any trigger voltage pulse being applied to trigger electrode 4. Where, as here, both voltages are simultaneously applied, ionization of the gas in discharge device 1 occurs very rapidly. Breakdown occurs between cathode 2 and anode 3, and capacitor 6 discharges therebetween.

Capacitor 30 in the trigger electrode circuit functions to limit current flow through trigger electrode 4 which is often a fine wire electrode that could easily be damaged by the large discharge currents present in the gaseous discharge device 1. Similarly, capacitor 32 functions to limit the flow of discharge current through secondary winding 19, forcing it to flow through diode 14.

While one diode 14 has been illustrated, a plurality of diodes could be connected in series. However, for control purposes, it is sometimes desirable to limit the amplitude of the boost voltage created across diode 14 to a smaller value than would otherwise be available. This may be accomplished by utilizing for diode 14 a single diode having avalanche characteristics that cause it to hold at a predetermined reverse bias voltage level and to conduct in the reverse direction whenever applied reverse bias voltage tends to exceed the predetermined voltage level.

Figure 2:
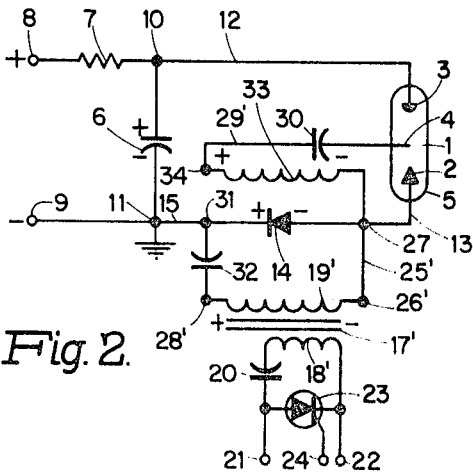
FIGS. 2, 3, 4, 5, 6, 7 and 8 illustrate alternative embodiments of the electric system of FIG. 1.

It will now be apparent to those skilled in the art that the results achieved with the system of FIG. 1 can likewise be achieved with the system of FIG. 2 wherein two secondary windings 19' and 33 are used. Here, control of the boost voltage can also be achieved by varying the number of turns of winding 19'. Note that the voltage induced in winding 19' is applied only to diode 14, while the voltage induced in winding 33 is applied only to trigger electrode 4 through conductor 29' and capacitor 30.

Figure 3:
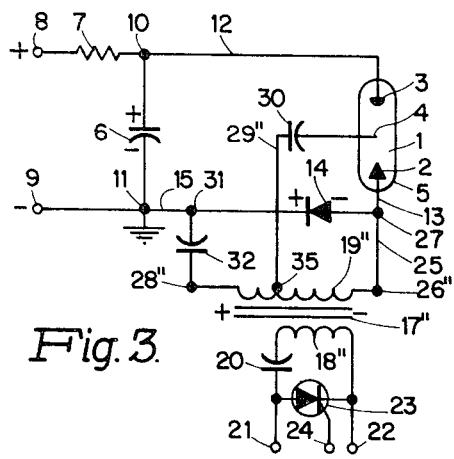
Figure 4:
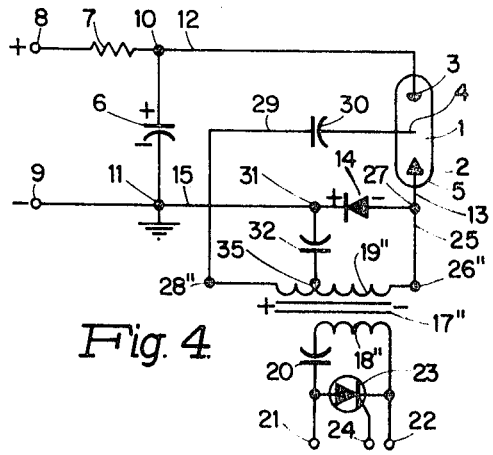

It will now also be apparent to those skilled in the art that a secondary winding 19" tapped at a point 35 can be used in the systems illustrated in FIGS. 3 and 4. Thus, the system of FIG. 3 can supply a boost voltage across diode 14 having a greater amplitude than the amplitude of the voltage pulse applied between trigger probe 4 and cathode 2. Conversely, the system of FIG. 4 provides a voltage pulse between trigger probe 4 and cathode 2 having a greater amplitude than the amplitude of the boost voltage across diode 14.

Figure 5:
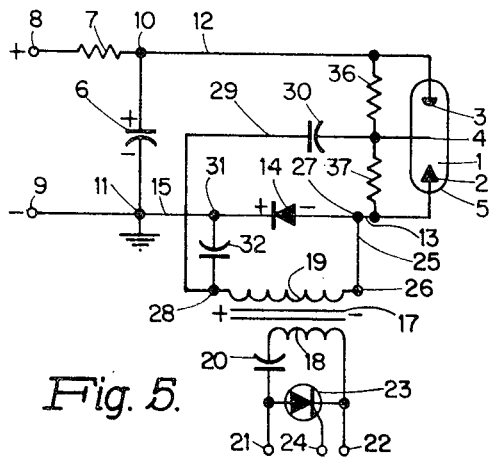
Figure 6:
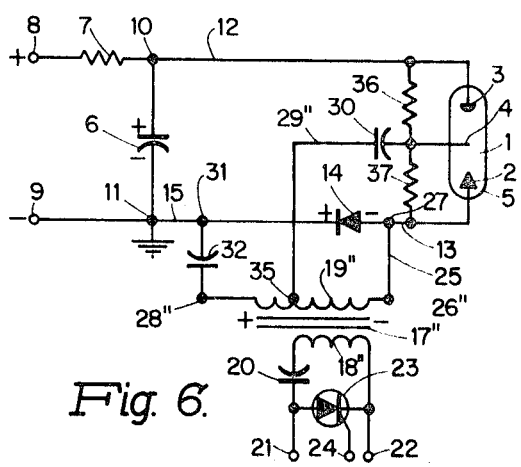
Figure 7:
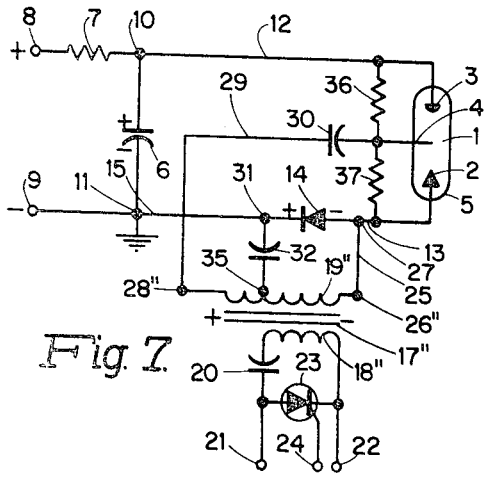

FIGS. 5, 6 and 7 correspond to FIGS. 1, 3 and 4 respectively, the only change being that resistors 36 and 37 have been connected between anode 3 and trigger electrode 4, and trigger electrode 4 and cathode 2 respectively. Resistors 36 and 37 act as a voltage divider across the voltage on charged capacitor 6 and maintain trigger electrode 4 at a predetermined potential level whenever capacitor 6 is charged and before a trigger signal is applied at terminal 24. It is believe that this use of resistors 36 and 37 helps to avoid spurious discharge of gaseous discharge device 1.

Figure 8:
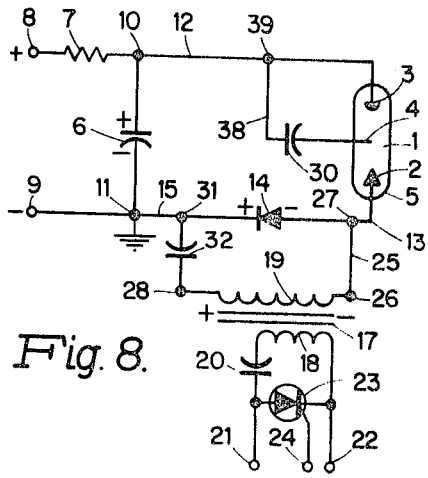

The system of FIG. 8 differs from the system of FIG. 1 in that trigger electrode 4 connects through capacitor 30 and conductor 38 to conductor 12 at node 39. Thus, trigger electrode 4 is at essentially the same potential level as anode 3 when the trigger signal is applied to terminal 24. The boost voltage developed across diode 14 drives cathode 2 negative with respect to ground by an amplitude equal to the amplitude of the boost voltage. Ionization commences between cathode 2 and trigger electrode 4 and simultaneously the anode 3-cathode 2 combination of electrodes is overvoltaged causing breakdown of gaseous discharge device 1 and immediate discharge of charged capacitor 6 through the device.

Figure 9:
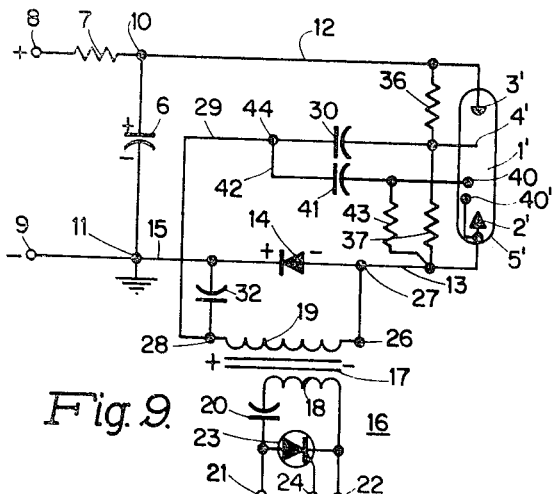
FIGS. 9 and 10 illustrate the present invention used in electric systems for operating four-electrode gaseous discharge devices.

FIG. 9 illustrates the modification of the system of FIG. 5 for use with a four-electrode gaseous discharge device 1 of the type having a light-producing spark gap incorporated therein, such as disclosed in U.S. Pat. No. 3,350,602 to K. J. Germeshausen et al. and assigned to the same assignee as the present invention. The light producing spark gap is here shown schematically by electrodes 40 and 40' with electrode 40' being internally connected to cathode 2'. Electrode 40 connects through capacitor 41 by conductor 42 to conductor 29 at node 44. Also, resistor 43 connects electrode 40 to conductor 13. Circuit operation is quite similar to that of FIGS. 1 and 5, the major difference being that the light producing spark gap 40—40' produces a small flash of light when the trigger pulse is applied to help overcome the dark start problem discussed in the above Letters Patent. It will be seen that FIG. 10 corresponds to FIG. 8 in the method of achieving triggering for the four-electrode gaseous discharge device 1' of FIG. 9.

Figure 11:
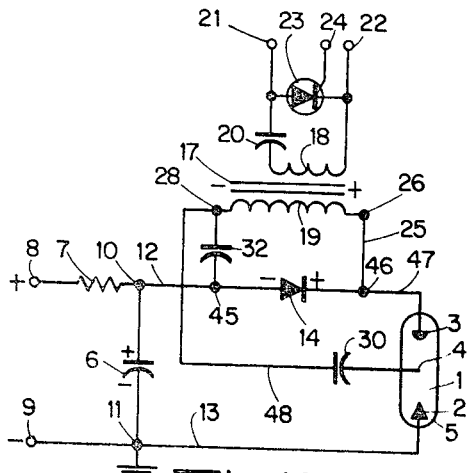
Figure 12:
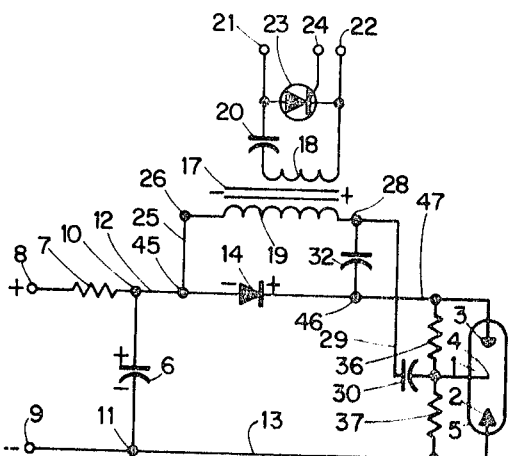

FIG. 11 illustrates the present invention interposed in the circuit between the node 10 and anode 3, with the variations that the secondary pulse applied to trigger electrode 4 is taken from terminal 28 and causes ionization to be initiated between anode 3 and trigger electrode 4. Simultaneously, overvoltaging of the cathode 2-anode 3 electrodes occurs and breakdown occurs. This circuit is less desirable than that shown in FIG. 12 which is the anode system equivalent of the system shown in FIG. 5. In FIG. 12, trigger electrode 4 and anode 3 are at approximately the same potential as the positive plate of capacitor 6 before the trigger signal is received. When the trigger signal is applied at terminal 24 the voltage pulse produced in secondary winding 19 drives trigger electrode 4 highly positive with respect to cathode 2. Ionization commences between trigger electrode 4 and cathode 2. Simultaneously, the boost voltage created across diode 14 adds in series with the voltage across capacitor 6 and is applied to overvolt the anode 3-cathode 2 combination, also initiating ionization in the gas.

Events occur so rapidly in these gaseous discharge devices that it is impossible to determine precisely what happens in the gas between the three electrodes when these voltages are simultaneously applied. Hence, the statement made herein that ionization commences between trigger electrode 4 and cathode 2 and that simultaneously ionization starts between anode 3 and cathode 2 is mere statement of belief that this may be what happens. Accordingly, I do not desire to be bound by such statements of belief, because the actual events that do occur could vary considerably from may present belief.

FIG. 13 corresponds to FIG. 6 and FIG. 14 corresponds to FIG. 7, except that the system of the present invention has been interposed in the anode circuit of gaseous discharge device 1.

FIGS. 15 through 21 illustrate the use of the system of the present invention with gaseous discharge devices of the type disclosed in U.S. Pat. No. 2,977,508 issued to K. J. Germeshausen and Pat. No. 3,350,602 issued to K. J. Germeshausen et al., both assigned to the same assignee as the present invention.

Referring to FIG. 15, gaseous discharge device 51 has two main electrodes denoted cathode 52 and anode 53, a plurality of trigger electrodes 54 and a light producing spark gap 56—56' enclosed in envelope 55 and filled with one or more of a variety of gases as hereinabove described. The free ends of trigger electrodes 54 are usually successively disposed at substantially equal intervals in the space and direction between anode 53 and cathode 52, and serve to confine the discharge arc to a substantially small linear volume between cathode 52 and anode 53. As illustrated schematically, the tip of trigger electrode $54_1$ is first in line to cathode 52; the tip of trigger electrode $54_2$ comes next; then successively the tips of trigger electrodes $54_3$ and $54_4$; and finally the tip of trigger electrode $54_5$ is spaced from but adjacent anode 53. Capacitors 58 connect trigger electrodes 54 and spark gap electrode 56 to a common bus 59 and resistors 57 maintain these electrodes at predetermined potential levels when capacitor 6 is charged to prevent spurious discharge. As hereinabove described, trigger electrodes 54 are usually fine wires that could be easily damaged if they draw arc current; hence capacitors 58 serve to limit the flow of large currents through them. Gaseous discharge devices of this type are particularly useful as electric flashtubes were the fill gaseous mixture may be xenon, hydrogen and argon as described in the said U.S. Pat. No. 3,399,147.

In FIG. 15, the system of the present invention has been inserted in the circuit of cathode 52. With capacitor 20 charged, a trigger signal applied at terminal 24 causes SCR 23 to conduct and capacitor 20 thereupon discharges through primary winding 18 of trigger transformer 18. A high amplitude voltage pulse having the polarity indicated is induced in secondary winding 19. This voltage pulse is applied by conductor 29 and capacitors 58 and by conductors 25 and 13 across trigger electrodes 54 and cathode 52 and across the electrodes 56, 56' of the light producing spark gap. Simultaneously, a boost voltage is created across diode 14 with the polarity indicated which adds in series with the voltage across capacitor 6. The sum of these two voltages is applied across cathode 52 and anode 53.

It is believed that a number of events occur simultaneously. A very small flash of light is produced by a small arc discharge across electrodes 56, 56'. This itself initiates some ionization and is utilized to induce photoionization to overcome the dark start problem described in said U.S. Pat. No. 3,350,602. Cathode 52 is driven highly negative with respect to ground and the large potential between it and trigger electrode $54_1$ causes the gas in the space therebetween to ionize, breakdown occurs and an arc jumps from cathode 52 to trigger electrode $54_1$, driving its potential level highly negative. Now, a large potential difference exists between trigger electrodes $54_1$ and $54_2$; the gas in the space between them ionizes and the arc jumps to trigger electrode $54_2$. This process is believe to continue until trigger electrode $54_5$ is driven to the same low negative potential as cathode 52. At this time, the potential of the sum of the boost voltage on diode 14 and across capacitor 6 is applied between trigger electrode $54_5$ and anode 53; ionization therebetween results and the arc jumps to anode 53. With the high potentials present on the various electrodes it is possible that the arc jumps from an intermediate trigger electrode such as $54_3$ direct to anode 53. The result is extremely fast firing of the discharge device with the production of a brilliant flash of light in electric flashtubes of this design. When the arc circuit is completed between cathode 52 and anode 53 capacitor 6 discharges through the device and through diode 14. Again, capacitor 32 prevents discharge of energy from capacitor 6 through secondary winding 19 of trigger transformer 17. Likewise, control of the amplitude of the boost voltage created across diode 14 may be achieved by using a diode having avalanche characteristics or by tapping secondary winding 19'' as illustrated in FIG. 16, or a combination of both. SImilarly, control of the amplitude of the trigger pulse applied to trigger electrodes 54 and spark gap electrode 56 may be achieved by tapping secondary winding 19'' as illustrated in FIG. 17.

Figure 10:
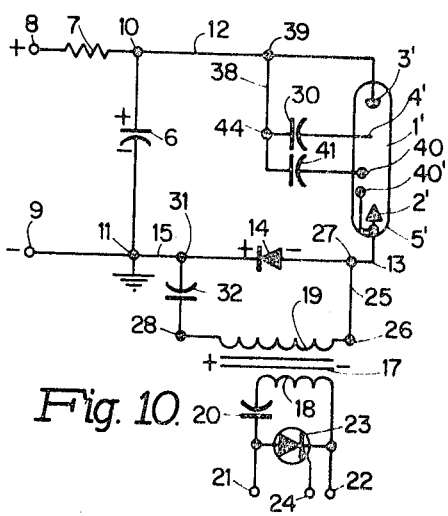

FIG. 18 illustrates an alternative circuit corresponding to that shown in FIG. 10 where bus 59 is shown connected to conductor 12 at node 61. In this system, trigger electrodes 54 and spark gap electrode 56 initially are at the potential level of anode 53. When the high voltage pulse is induced in secondary winding 19 upon application of the trigger signal at terminal 24, cathode 52 and spark gap electrode 56' are driven highly negative with respect to ground. Ionization occurs and the arc travels substantially as described above.

FIGS. 19, 20 and 21 illustrate the use of the system in the circuit of anode 53. Although trigger electrodes 54, spark gap electrode 56 and anode 53 are driven highly positive with respect to grounded cathode 52 and spark gap electrode 56', the events which occur are believed to be substantially as described above, with trigger electrodes 54 successively being driven to ground potential as the arc travels up to anode 53. It will be noted that FIGS. 19, 20 and 21 correspond respectively to FIG. 12, 13 and 14.

Examples of flashtubes used with the system of the present invention are the FX–115 as in FIG. 9 and the FX–6A, 6B, 6AU, 6BU, 35B, 101, 101B, 102, 108, 108B, 108AU, 108BU and 76, as in FIG. 15, all such flashtubes being manufactured and sold by the assignee of the present invention. The FX–6A, FX–6B, FX–35 and FX–102 flashtubes were tested in the circuit of FIG. 15 having the components and circuit values listed below.

1. EG&G FY-5D Litepacs having:
   Capacitors 58         20 pf
   Resistors 57          4.7 MEGOHM ½ w
   Capacitor 32          20 pf
   Pulse Transformer 17
2. Diode 14              EDI 1 N 4145

The amplitudes of the trigger voltage pulse applied to trigger electrodes 54 that was required to fire these flashtubes when capacitor 6 was charged to 375 VDC are tabulated below:

| Flashtube Type | Prior Art Circuit | Circuit of FIG. 15 |
| --- | --- | --- |
| FX–6A | 1350 V | 575 V |
| FX–6B | 1000 V | 475 V |
| FX–35 | 2150 V | 975 V |
| FX–102 | 3000 V | 1250 V |

Compared to the prior art, the voltage on main discharge capacitor 6 can consistently be reduced and the triggering voltage amplitudes can likewise be reduced, both at the expense of improved operating results. This means that the power supplies for charging capacitor 6 and capacitor 20 can be reduced in size, weight and cost, and at the same time improved operating results can be achieved.

Further modifications and circuit variations will occur to those skilled in the art and all such are considered to fall within the spirit and scope of the invention as defined in the appended claims.

What is claimed is:

1. In an electric system for firing a gaseous discharge device having two main electrodes and at least one trigger electrode, the system having a main discharge capacitor connected in series with the main electrodes, a power supply for charging the discharge capacitor to a predetermined voltage, and a trigger circuit having a pulse transformer with a secondary winding in which a trigger pulse is induced which is applied between the trigger electrode and one main electrode to initiate breakdown of the gas in the gaseous discharge device thereby permitting discharge of the main discharge capacitor between the main electrodes, the improvement comprising:
   a semiconductor type diode connected in series with the discharge capacitor and main electrodes and poled to conduct the discharge energy when the main discharge capacitor is discharged through the gaseous discharge device; and
   circuit means connecting the secondary winding in parallel with the semiconductor diode, the secondary winding being so poled that the induced trigger pulse creates a boost voltage across the semiconductor diode in series with and in the same polarity as the predetermined voltage.

2. The electric system as in claim 1 in which the gaseous discharge device has a plurality of trigger electrodes, and the trigger pulse is applied between the plurality of trigger electrodes and one main electrode.

3. The electric system as in claim electrode; in which:
   the gaseous discharge device has a single trigger electrode and
   the trigger pulse is applied between the single trigger electrode and one main electrode.

4. As electric system as in claim 1 in which:
   the circuit means further comprises means to limit discharge of the main discharge capacitor through the secondary winding.

5. An electric system, comprising:
   a gaseous discharge device having a pair of principal electrodes and at least one trigger electrode;
   a semiconductor diode; a capacitor chargeable to a predetermined voltage through a first path and discharged through a second path;
   the second path having the principal electrodes of the discharge device, the diode and the discharge capacitor connected in series, the diode being poled to be conductive when the capacitor discharges through the discharge path;
   a trigger transformer having a primary winding an a secondary winding connected between the trigger electrode and one principal electrode,
   the diode being connected in parallel with the secondary winding; and
   means for inducing a trigger pulse in the secondary winding to produce a boost voltage, across the diode, so poled as to add to the predetermined voltage of the capacitor.

6. An electric system as in claim 5 further comprising means to limit discharge of the main discharge capacitor through the secondary winding.

7. The electric system as in claim 5 in which:
   the gaseous discharge device has a plurality of trigger electrodes; and
   the secondary winding is connected between the plurality of trigger electrodes and one principal electrode.

8. The electric system as in claim 6 in which:
the gaseous discharge device has a single trigger electrode and
the secondary winding is connected between the single trigger electrode and one principal electrode.

* * * * *

PO-1050
(5/69)

UNITED STATES PATENT OFFICE
CERTIFICATE OF CORRECTION

Patent No. 3,624,445            Dated November 30, 1971

Inventor(s) Ralph L. Cadwallader

It is certified that error appears in the above-identified patent and that said Letters Patent are hereby corrected as shown below:

Column 4, line 14, delete "may" and insert --my--.

Column 5, line 22, delete "SImilarly" and insert --Similarly--.

Column 6, line 39, delete "electrode;" and insert --1--.

Column 6, line 59, delete "an" and insert --and--.

Signed and sealed this 24th day of April 1973.

(SEAL)
Attest:

EDWARD M. FLETCHER, JR.        ROBERT GOTTSCHALK
Attesting Officer                 Commissioner of Patents

Dedication 3,624,445.—*Ralph L. Cadwallader*, Concord, Mass. ELECTRIC SYSTEM FOR FIRING A GASEOUS DISCHARGE DEVICE. Patent dated Nov. 30, 1971. Dedication filed Nov. 23, 1973, by the assignee, *EG & G, Inc.*

Hereby dedicates to the Public the entire term of said patent.

[*Official Gazette November 23, 1976.*]